April 29, 1969  O. H. MAXWELL  3,440,809
HARVESTER FOR NUTS AND THE LIKE
Filed Jan. 14, 1966  Sheet 1 of 3

INVENTOR.
OLIVER H. MAXWELL
BY Gardner & Zimmerman
ATTORNEYS

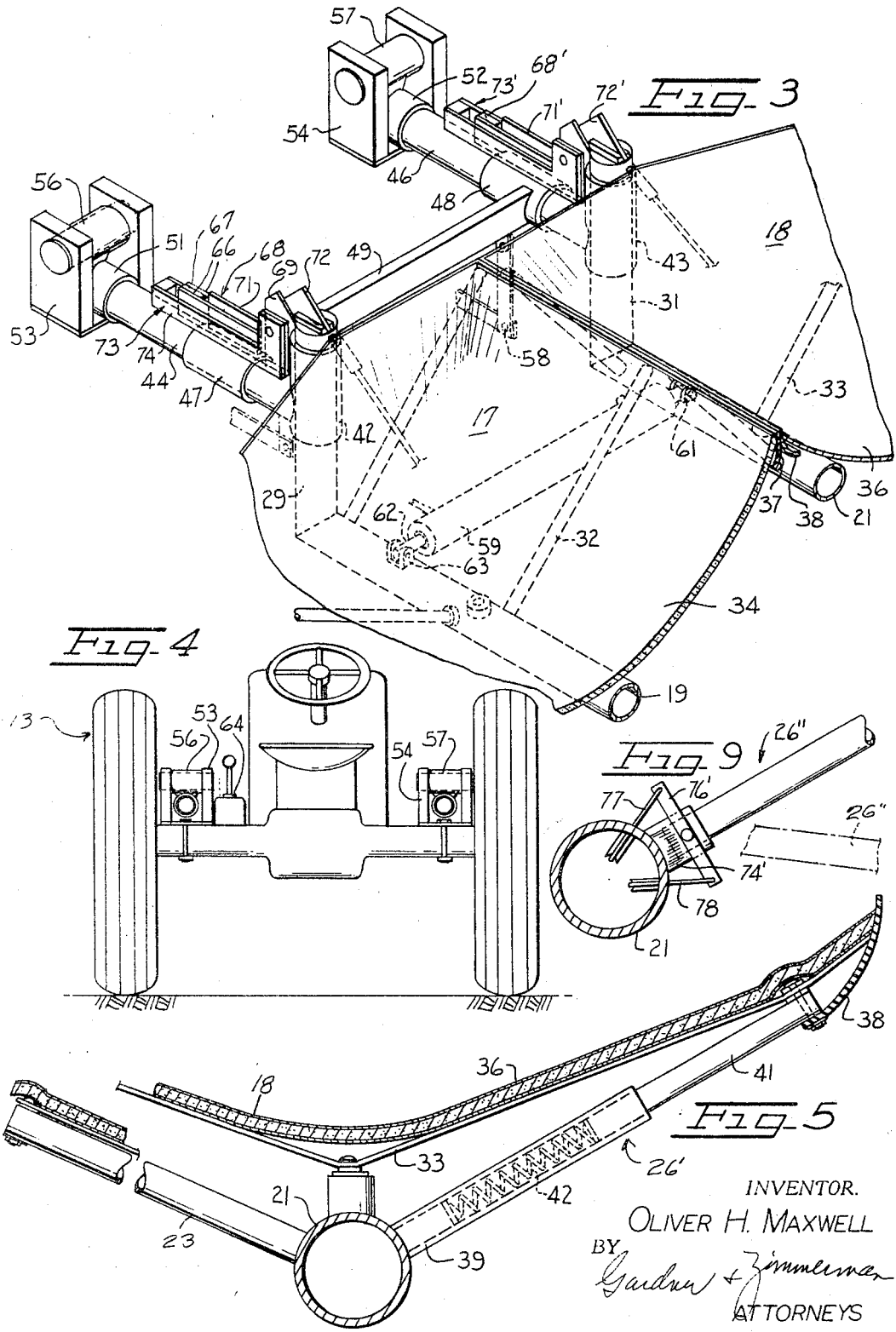

United States Patent Office
3,440,809
Patented Apr. 29, 1969

3,440,809
HARVESTER FOR NUTS AND THE LIKE
Oliver H. Maxwell, Rte. 1, Box 53B,
Suisun City, Calif. 94585
Filed Jan. 14, 1966, Ser. No. 520,614
Int. Cl. A01g *19/08;* B65g *11/10*
U.S. Cl. 56—329                    5 Claims

ABSTRACT OF THE DISCLOSURE

A harvesting basket for tree grown produce is described which is adapted for cantilevered support from a tractor or the like. The basket is formed with a pair of wings arranged for selective movement in a variety of directions to permit placement of the same around a tree trunk so as to catch produce shaking from the tree limbs.

---

This invention relates to harvesters for catching nuts and other produce shaken from a tree so that they may be accumulated for crating, etc., and is more particularly directed to a harvester in the form of an attachment for a draft vehicle and which is arranged for selective movement into underlying relation to the branches of a tree to receive produce therefrom and movement into a gravity conveyor configuration by which the collected produce may be delivered to an accumulation point for crating, or the like.

In the harvesting of nuts and various other produce, it is the usual practice to rigorously shake a tree to cause the produce to fall in large quantity therefrom. A tarpaulin is frequently placed on the ground about the tree in order to catch and accumulate the falling produce. The tarpaulin may then be dragged to an accumulation location whereat the produce is, for example, manually packed in crates or dumped onto a conveyor arranged to deliver the produce to crates in a substantially automatic fashion. It will be appreciated that such method of harvesting with the aid of a tarpaulin is disadvantageous from the standpoint of the substantial manual manipulation involved which adds materially to the time required to harvest the crop. As an alternative to the use of a tarpaulin, special harvesting vehicles may be employed to catch the produce falling from a tree and convey same to a crating location. Such harvesing apparatus, however, is relatively complex and expensive in that it is integrally incorporated in a vehicle.

It is therefore an object of the present invention to provide harvesting apparatus in the form of a relatively simple, comparatively low cost attachment which is adapted for use with existing tractors or equivalent draft vehicles.

Another object of the invention is to provide a harvesting basket for cantilevered support from a tractor, or the like, such that the basket may be moved by the tractor beneath the limbs of a tree to catch produce shaken therefrom, and thereafter conveyed to an accumulation point for loading into crates, etc.

Still another object of the invention is the provision of a harvester of the class described having a basket defined by a pair of wings arranged for selective movement apart and together to facilitate positioning of the basket about the trunk of a tree, and movement to inclined positions to provide a gravity feed conveyor configuration for delivery of produce accumulated in the basket to crates or the like.

It is yet another object of the invention to provide a harvester of the class described arranged such that a single hydraulic cylinder is capable of selectively effecting movement of the wings apart and together as well as between horizontal and inclined positions.

A further object of the invention is the provision of a harvester of the class described having means for selectively pivoting the wings to vertical folded positions to facilitate unobstructed conveyance of the harvester among the trees of an orchard.

FIGURE 3 is a fragmentary perspective view of the mounting arrangement for the wing portions of the harvester and locking means for facilitating selective movement of the wings in several different directions by means of a single hydraulic cylinder.

FIGURE 4 is a transverse sectional view through the harvester adjacent its connection to the tractor.

FIGURE 5 is a sectional view taken at line 5—5 of FIGURE 3, illustrating particularly a tree trunk engaging finger of the harvester.

FIGURE 9 is a sectional view taken at line 9—9 of FIGURE 2, illustrating particularly a dumping finger of the harvester.

Figure 1:
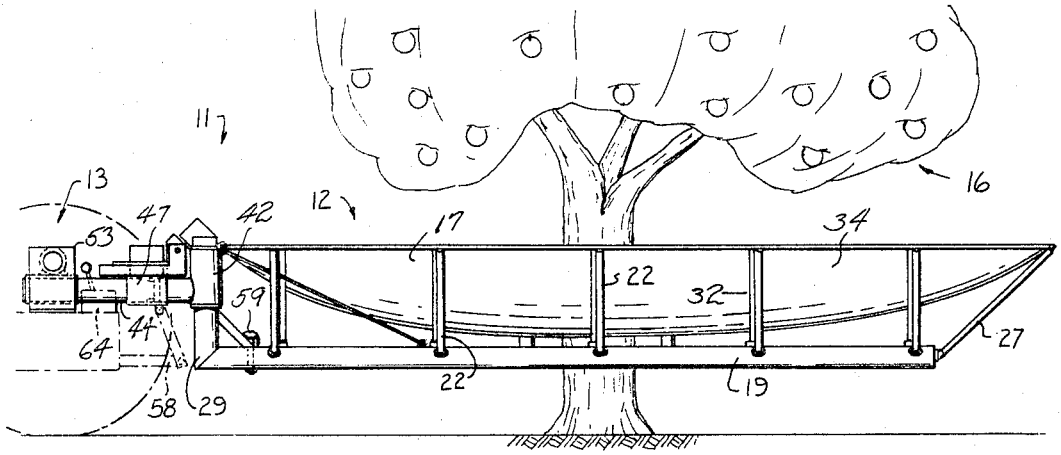
FIGURE 1 is a side elevational view of a harvester in accordance with the present invention as attached to a tractor and operatively associated with a tree.

Referring now to the drawings, there will be seen to be provided a harvester 11 which includes a basket 12 adapted for cantilevered attachment to the rear end of a tractor 13, or equivalent draft vehicle. The tractor serves as a means for moving the basket into position beneath a tree 16, as shown in FIGURE 1, such that when the tree is shaken, the nuts or other produce thereof fall into the basket. Thereafter, the basket may be moved by means of the tractor to an accumulation point whereat the produce in the basket may be delivered to crates, for example. In this regard, the basket is so arranged that it may be made to assume a gravity conveyor configuration such that the produce may be conveniently dumped into the crates.

Figure 2:
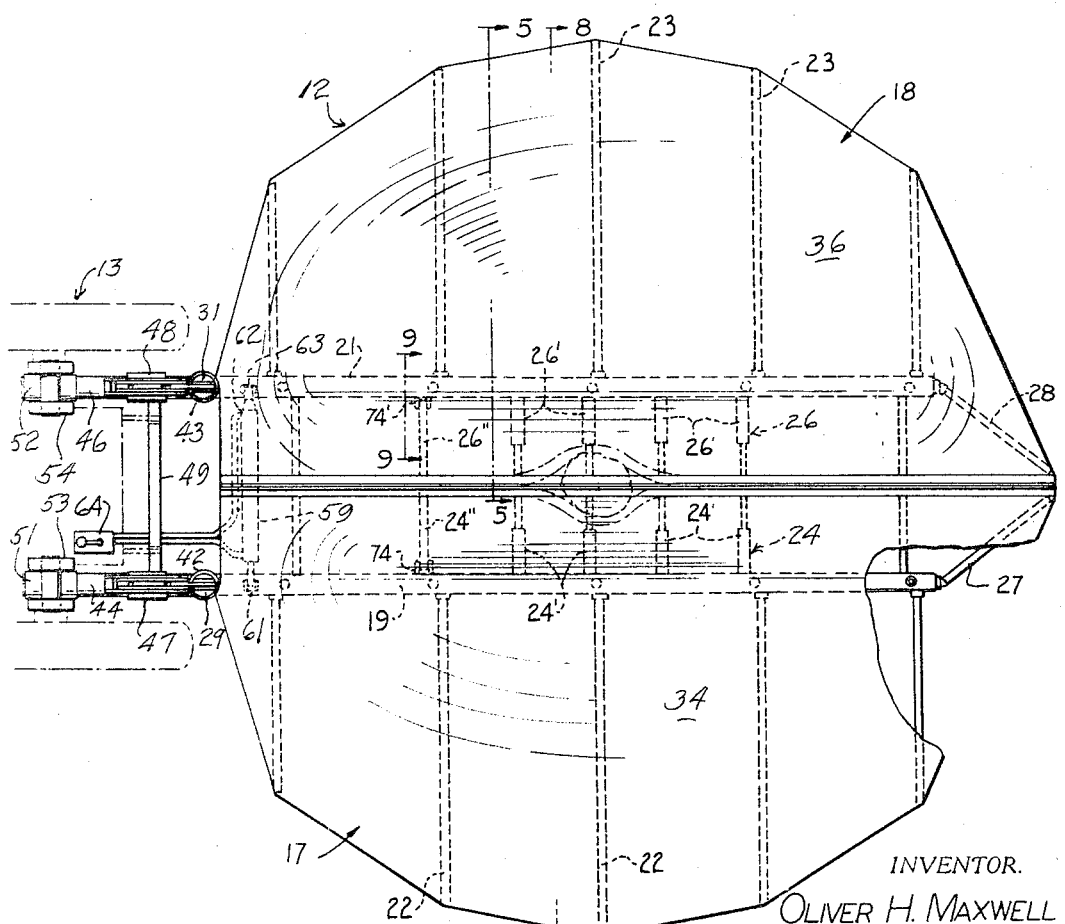
FIGURE 2 is a plan view of the arrangement of FIGURE 1.

In the accomplishment of the foregoing produce catching and dumping operations, the basket 12 is formed with a pair of wings 17, 18 which are arranged for selective movement in a variety of directions and in a manner subsequently described in detail herein. The wings respectively include longitudinal bars 19, 21 or equivalent members, from which pluralities of parallel longitudinally spaced fingers 22, 23 project laterally outward and upward. Pluralities of parallel longitudinally spaced fingers 24, 26 likewise project from the bars laterally inward and upward. A pair of fingers 27, 28 respectively project forwardly, inwardly, and upwardly from ends of the bars as shown in FIGURES 1 and 2, while the opposite ends of the bars are provided with upwardly projecting posts 29, 31. The fingers 22, 23 are of progressively decreasing lengths on opposite sides of the central ones thereof. Webbing 32 is secured between the tips of fingers 22, 24, 27 while webbing 33 is secured between the tips of fingers 23, 26, 28 in the manner best shown in FIGURE 5. The webbings dip downward from the tips of the fingers and are secured to the bars 19, 21. Foldable aprons 34, 36 of canvas like material are in turn secured to the webbings. Such aprons are of substantially semi-circular configuration and extend between the tips of the fingers and the upper ends of the posts 29, 31. In this manner, the upper surfaces of the aprons assume concave configurations whereby each of the wings 17, 18 is capable of retaining produce that is dropped thereinto.

The wings further include flexible beltings 37, 38 which extend longitudinally along the inner edges thereof. More particularly, the beltings are secured to the tips of the inner fingers 24, 26 of the respective wings. A central group of fingers $24^1$, $26^1$ are collapsible in order that the beltings 37, 38 and aprons 34, 36 will yield upon being urged against a tree trunk and fit relatively closely thereabout. Preferably, such fingers $24^1$, $26^1$ are respectively formed of telescoping tubular sections 39, 41 having a coil spring 42 acting therebetween, as shown in FIGURE 5. The spring resiliently urges the section 41 outwardly from section 39 to a normally extended position. The beltings 37, 38 are secured to the free ends of the outer sections 41 of the respective fingers, and thus when the beltings are urged against a tree trunk, the outer sections are retracted into the sections 39 in a manner which permits the beltings to substantially conform to the contour of the tree trunk.

Considering now the manner in which the wings 17, 18 are secured to the tractor 13 to provide the basket 12, it is of importance to note that the mounting arrangement is such as to permit selective rotation of the bars 19, 21 of the respective wings about vertical and longitudinal axes, and rotation of the bars integrally about a transverse axis. More particularly, as best shown in FIGURE 3, the posts 29, 31 are journalled within vertical bushings 42, 43 projecting from the free ends of cylindrical longitudinally extending support members 44, 46. Such support members are journalled at positons intermediate their ends within longitudinal bushings 47, 48 transversely interconnected by means of a cross member 49. Support members 44, 46 are likewise journalled at their free ends within longitudinal bushings 51, 52 carried by clevises 53, 54 journalled for rotation about transverse pivot pins 56, 57 mounted adjacent the rear end of the tractor 13. The cross member 49 is secured to, and supported by a hydraulically actuated lifting linkage 58 normally provided as an integral component of the tractor.

It will be appreciated that with the wings 17, 18 thus mounted upon the tractor, the wing bars 19, 21 are rotatable about vertical axes by virtue of the posts 29, 31 being mounted in bushings 42, 43, and rotatable about longitudinal axes by virtue of the support members 44 and 46 being mounted in bushings 47, 51 and 48, 52. Furthermore, the wing bars 19, 21 may be integrally elevated to positions inclined away from the end of the tractor in response to the linkage 58 acting on cross member 49 to pivot support members 44, 46 upwardly about pins 56, 57.

As an important feature of the invention, movement of the wing bars 19, 21 about vertical and longitudinal axes may be selectively effected by means of a single hydraulic cylinder. In this regard, a hydraulic cylinder 59 is preferably provided with its base end connected by means of a universal joint 61 to bar 19, and the free end of its piston rod 62 connected by means of a universal joint 63 to bar 21. The cylinder is transversely disposed between the bars at a position adjacent the posts 29, 31. The ports at the opposite ends of the cylinder are preferably connected to the hydraulic system of the tractor through a control valve 64. However, if desired, a separate hydraulic system can be provided.

In one position of the control valve 64, the piston rod 62 is extended from the cylinder, while in a second position the piston rod is retracted. In order to obtain the desired movements of the wing bars by actuation of the cylinder, locking means are provided for selectively locking the posts 29, 31 against rotation in bushings 42, 43, locking the members 44 and 46 against rotation in bushings 47, 51 and 48, 52, or both. Preferably, the locking means are each provided as a pair of parallel spaced L-shaped plates 66 joined at one end by a spacer 67 to define a clasp 68. The oher end of the clasp is pivotally secured to an ear 69 that projects upwardly from the support member 44 at a position adjacent bushing 42, the plates being on opposite sides of the ear. By pivoting the clasp, the space defined between plates 66 adjacent the free end thereof is selectively engageable with a lug 71 that projects upwardly from bushing 47, or a lug 72 that projects upwardly from the upper end of post 29. It will be thus appreciated that in one position of the clasp, the lug 71 is engaged to thereby lock member 44 against rotation in longitudinal bushings 47, 51 while permitting rotation of post 29 in vertical bushing 42. In a second position of the clasp, the lug 72 is engaged to lock post 29 against rotation in vertical bushing 42 while permitting rotation of member 44 in longitudinal bushings 47, 51. In order that rotation of member 42 in longitudinal bushings 47, 51 and rotation of post 29 in vertical bushing 42 may be simultaneously prevented, if desired, a second clasp 73 similar to clasp 68 is advantageously provided having L-shaped plates 74 laterally outward from plates 66 and pivotally secured to ear 69. The clasp 73 may be likewise selectively engaged with lug 71 or lug 72 in a manner similar to clasp 68, upon pivotal movement of such clasp 73. Hence, when clasp 68 is engaged with one lug 71, the other clasp 73 may be engaged with lug 72 to prevent rotation of wing bar 19 about both vertical and longitudinal axes. A set of clasps $68^1$, $73^1$ are similarly pivotally mounted upon support member 46 for selective engagement in a like manner with lugs $71^1$, $72^1$ associated with bushing 48 and post 31 to facilitate selective rotation of wing bar 21 about longitudinal or vertical axes, or prevent rotation about either axis.

Figure 6:
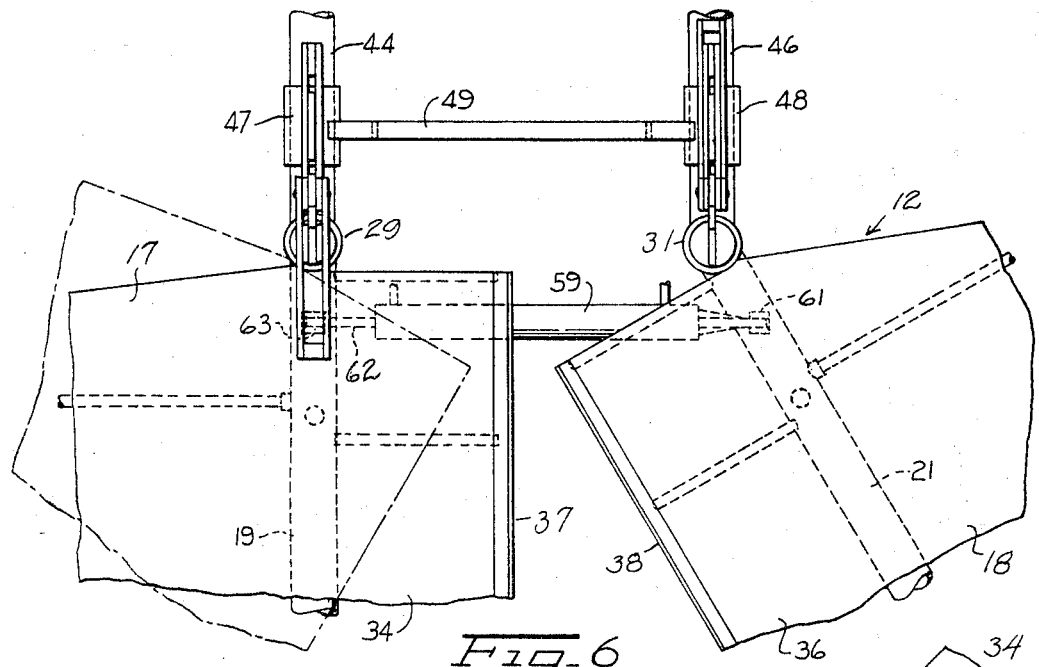
FIGURE 6 is a fragmentary plan view of the harvester depicting the wings in spaced-apart spread position.

In a typical operation of the harvester basket 12, clasps 68 and 73 are respectively engaged with lugs 71 and 72 to thus lock wing bar 19 against rotation about longitudinal and vertical axes. Clasps $68^1$, $73^1$ are both engaged with lug $71^1$ to lock support member 46 against rotation within longitudinal bushings 48, 52 while permitting rotation of post 31 within vertical bushing 43. The hydraulic cylinder 59 is then actuated by means of control valve 64, whereupon the piston rod 62 is extended from the cylinder to urge wing 18 outwardly from wing 17 as indicated in full line in FIGURE 6. With wing 18 thus spread from wing 17, the tractor 13 is manipulated to back the spread wings toward the trunk of a tree and position the respective wings on opposite sides of same. Alternatively, both wings could be spread outwardly, as indicated in phantom line in FIGURE 6 by placing both clasps 68, 73 in engagement with lug 71. In either case, the cylinder 59 is now actuated to retract the piston rod 62. As a result, the wings are pulled together to engage the beltings 37, 38 against the tree trunk, and by virtue of collapsible fingers $24^1$, $26^1$, the beltings fit snugly about the trunk. The tree is shaken to cause the produce to drop into the basket wings. The produce is collected and retained in the wings due to the concave configuration of the aprons thereof. Now the hydraulic cylinder may be actuated to spread the wings and thereby disengage them from the tree trunk. The tractor 13 is now manipulated to tow the produce laden wings away from the tree trunk, after which the cylinder is actuated to pull the wings together into parallel relation. Next, the tractor tows the wings to a produce accumulation point for crating. At the accumulation point the clasps 68, 73 are engaged with lug 72 and clasps $68^1$, $73^1$ are engaged with lug $72^1$. The posts 29, 31 are hence locked against rotation in vertical bushings 42, 43, but the support members are free to rotate in longitudinal bushings 47, 51 and 48, 52.

Figure 7:
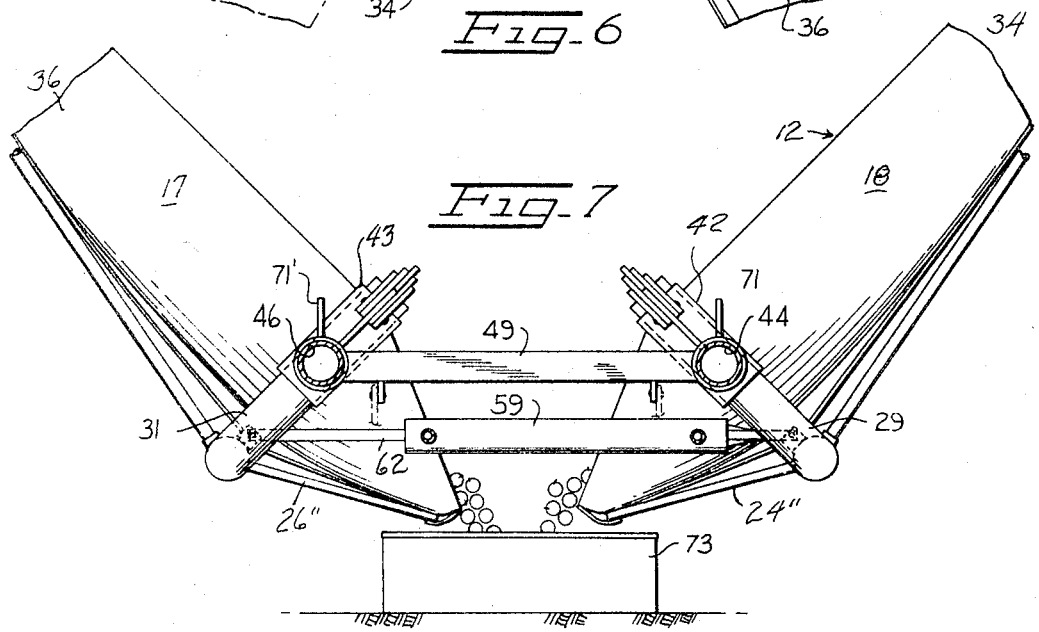
FIGURE 7 is a transverse sectional view through the harvester depicting the wings in inclined position to define a gravity feed conveyor configuration for facilitating dumping of collected produce.
Figure 8:
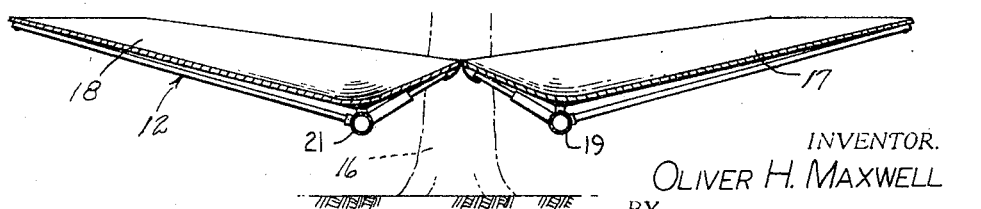
FIGURE 8 is an end view of the harvester as positioned in operative association with a tree.

The hydraulic linkage 58 is actuated to incline the wings slightly upwardly from the tractor and thereby cause the produce to be gravity fed to positions of the wings adjacent the tractor. The hydraulic cylinder is also actuated to extend the piston rod 62 and thereby pivot the respective wing bars 19, 21 about longitudinal axes and thereby incline the wings transversely into dumping positions as shown in FIGURE 7. Dumping of the respective wings into an underlying crate 73 adjacent the rear end of the tractor may then be readily effected by means of dumping fingers $24^{11}$, $26^{11}$ provided adjacent the ends of the wings secured to the tractor. More particularly, as shown in FIGURE 9, the dumping fingers are respectively mounted upon bars 19, 21, as by means of clevises 74, 74¹ for rotation about longitudinal axes. Arms 76, 76¹ rigidly secured transverse to the dumping fingers have their opposite ends secured to pull cables 77, 78. When one cable 77 is pulled taut, the finger is maintained in a normal upwardly inclined non-dumping position. When the other cable 78 is pulled taut, the dumping finger is pulled downwardly to a downwardly inclined dumping position wherein each of the aprons 34, 36 is deformed downwardly in the region of the accumulated produce. The produce thus flows downwardly out of the wings into the underlying crate 73. In effect, the wings have thus been made to assume a gravity conveyor configuration.

What is claimed is:

1. A harvester comprising a basket arranged for placement about the trunk of a tree beneath the limbs thereof, and means for securing said basket in cantilevered support to a draft vehicle, said basket being formed by a pair of substantially semi-circular wings as viewed in plan view having concave upper surfaces, said securing means including rotatable mounting means coupled to each of said wings to mount same for selective movement about vertical, longitudinal, and horizontal transverse axes, each of said wings comprising a longitudinal bar, a plurality of longitudinally spaced outer fingers projecting laterally outward and upward from said bar, said fingers having propressively decreasing lengths on opposite sides of a longitudinally central one thereof, a plurality of longitudinally spaced inner fingers projecting laterally inward and upward from said bar, a central group of said inner fingers being collapsible, a leading finger projecting forwardly and upwardly from the end of said bar remote from said securing means, webbing secured between the tips of said fingers and secured to said bar, a flexible apron secured to said webbing and assuming a convex configuration at the upper surface thereof, and belting secured longitudinally between the tips of said inner fingers.

2. A harvester according to claim 1, wherein each of said bars is formed with an upright post at the end thereof adjacent said mounting means, and each of said mounting means comprises a cylindrical support member having a vertical bushing at a first end thereof rotatably receiving one of said posts, longitudinal bushing means rotatably receiving said support member, means for mounting said longitudinal bushing means upon said draft vehicle for selectable powered movement about a horizontal transverse axis, and locking means carried by said support member for selectively locking said post against rotation in said vertical bushing or locking said support member against rotation in said longitudinal bushing means.

3. A harvester according to claim 2, further defined by a hydraulic cylinder having a selectively retractable or extendible piston rod, and universal joint means respectively coupling said piston rod to one of said bars and the opposite end of said cylinder to the other of said bars at a transverse position adjacent said posts.

4. A harvester according to claim 3, further defined by said locking means comprising a lug projecting upwardly from the upper end of said post, a second lug projecting upwardly from said longitudinal bushing means, a clasp pivotally mounted on said support member for pivotal movement between first and second positions respectively of engagement with said first and second lugs, and a second clasp mounted upon said support member for pivotal movement about the same axis as said first clasp, said second clasp encompassed by said first clasp and being movable between first and second positions respectively of engagement with said first and second lugs.

5. A harvester according to claim 4, further defined by said longitudinal bushing means each comprising a first longitudinal bushing rotatably receiving the free end of said support member and a second longitudinal bushing rotatably receiving an intermediate portion of said support member, said second longitudinal bushing carrying said second lug, and said means for mounting said longitudinal bushing means upon said draft vehicle for selectable powered movement comprising clevises secured to said first longitudinal bushings of the respective longitudinal bushing means, a pair of transverse pivot pins received by said clevises and adapted for mounting on said draft vehicle, and a cross member secured transversely between said second longitudinal bushings of the respective longitudinal bushing means, said cross member adapted for connection to hydraulic lift linkage carried by said draft vehicle.

References Cited

UNITED STATES PATENTS

| | | | |
|---|---|---|---|
| 1,626,068 | 4/1927 | Bartlett | 56—328 |
| 2,714,281 | 8/1955 | Steele | 56—329 |
| 2,990,630 | 7/1961 | Crawford | 37—2 |
| 3,338,041 | 8/1967 | Arpin | 56—329 |

ABRAHAM G. STONE, *Primary Examiner.*

PASQUALE A. RAZZANO, *Assistant Examiner.*